US011136997B2

(12) United States Patent
Carlisle et al.

(10) Patent No.: US 11,136,997 B2
(45) Date of Patent: Oct. 5, 2021

(54) METHODS AND SYSTEMS FOR A COMPRESSOR HOUSING

(71) Applicant: Ford Global Technologies, LLC, Dearborn, MI (US)

(72) Inventors: Shawn Kevin Carlisle, South Lyon, MI (US); Adam Matthew Selthofer, Lasalle (CA); Anthony Morelli, Troy, MI (US); Kristofor Robert Norman, Canton, MI (US); Rick Renwick, Bloomfield, MI (US); Daniel Lawerence Sylvester, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/520,237

(22) Filed: Jul. 23, 2019

(65) Prior Publication Data

US 2021/0025408 A1    Jan. 28, 2021

(51) Int. Cl.
*F04D 29/40* (2006.01)
*F04D 29/60* (2006.01)
*F02C 6/12* (2006.01)

(52) U.S. Cl.
CPC .............. *F04D 29/601* (2013.01); *F02C 6/12* (2013.01); *F04D 29/40* (2013.01); *F04D 29/60* (2013.01); *F05D 2220/40* (2013.01); *F05D 2260/39* (2013.01)

(58) Field of Classification Search
CPC ...... F04D 29/601; F04D 29/403; F04D 29/60; F04D 29/40; F05D 2220/40; F05D 2260/39; F02C 6/12; F16B 39/22; F16B 39/282
See application file for complete search history.

(56) References Cited

U.S. PATENT DOCUMENTS

| 1,730,220 | A | * | 10/1929 | Lansing | F02N 19/001 |
| | | | | | 123/179.28 |
| 2,910,005 | A | * | 10/1959 | Angell | F01D 15/08 |
| | | | | | 417/366 |
| 2,997,958 | A | * | 8/1961 | Heinicke | F04D 29/628 |
| | | | | | 415/174.3 |
| 3,062,498 | A | * | 11/1962 | Angell | F01D 25/30 |
| | | | | | 415/191 |
| 3,490,794 | A | * | 1/1970 | Swanson | F16L 27/111 |
| | | | | | 285/148.11 |
| 3,829,235 | A | * | 8/1974 | Woollenweber, Jr. | |
| | | | | | F04D 29/584 |
| | | | | | 415/143 |
| 4,034,788 | A | * | 7/1977 | Melone | F16B 39/24 |
| | | | | | 411/134 |

(Continued)

OTHER PUBLICATIONS

Spurling, M. et al., "Deflection Apparatus for an Engine," U.S. Appl. No. 16/279,853, filed Feb. 19, 2019, 36 pages.

*Primary Examiner* — Justin D Seabe
*Assistant Examiner* — Theodore C Ribadeneyra
(74) *Attorney, Agent, or Firm* — Geoffrey Brumbaugh; McCoy Russell LLP (57) ABSTRACT

Methods and systems are provided for a turbocharger. In one example, a system comprises a compressor housing clamped to a bearing housing via a clamp ring. The clamp ring may be configured to at least partially detach the compressor and allow the compressor to rotate and/or shift in response to a force.

18 Claims, 5 Drawing Sheets

(56) References Cited

U.S. PATENT DOCUMENTS

| | | | | |
|---|---|---|---|---|
| 4,827,756 A * | 5/1989 | Crigger | F16B 35/041 | 470/11 |
| 4,850,797 A * | 7/1989 | Benson | F01D 9/026 | 415/205 |
| 4,865,517 A * | 9/1989 | Beehler | F04D 29/083 | 415/214.1 |
| 5,401,146 A * | 3/1995 | Moriya | F04D 29/167 | 417/423.14 |
| 5,470,114 A * | 11/1995 | Umney | F16L 23/08 | 285/347 |
| 5,478,215 A * | 12/1995 | Kobayashi | F04D 29/406 | 417/423.14 |
| 5,567,133 A * | 10/1996 | Kobaybashi | F04D 13/14 | 417/423.7 |
| 5,616,013 A * | 4/1997 | Kobayashi | F04D 1/06 | 417/423.14 |
| 5,674,056 A * | 10/1997 | Yamamoto | F04D 13/14 | 417/366 |
| 5,704,761 A * | 1/1998 | Kobayashi | F04D 1/006 | 415/102 |
| 5,797,731 A * | 8/1998 | Kobayashi | F04D 13/14 | 417/238 |
| 6,056,518 A * | 5/2000 | Allen | F04D 13/06 | 415/219.1 |
| 6,247,909 B1 | 6/2001 | Williams et al. | | |
| 6,553,762 B2 * | 4/2003 | Loffler | F02C 6/12 | 60/605.1 |
| 7,198,459 B2 * | 4/2007 | Grussmann | F01D 9/026 | 415/134 |
| 7,963,315 B2 | 6/2011 | Ishikawa | | |
| 8,474,555 B2 | 7/2013 | Kanno | | |
| 8,979,455 B2 * | 3/2015 | Burton | F16B 33/002 | 411/166 |
| 9,097,181 B2 * | 8/2015 | Grussmann | F04D 29/4206 | |
| 9,341,081 B2 * | 5/2016 | Smatloch | F02C 6/12 | |
| 9,708,932 B2 * | 7/2017 | Jinnai | F01D 9/026 | |
| 2003/0053916 A1* | 3/2003 | Terauchi | F04C 23/00 | 417/374 |
| 2004/0265143 A1 | 12/2004 | Kawahara et al. | | |
| 2006/0133931 A1* | 6/2006 | Burmester | F01D 9/026 | 415/204 |
| 2008/0310978 A1* | 12/2008 | Hoffman | F04D 29/40 | 417/420 |
| 2010/0054934 A1* | 3/2010 | Boning | F02C 6/12 | 415/214.1 |
| 2010/0290899 A1* | 11/2010 | Elia | F02C 6/12 | 415/182.1 |
| 2010/0296925 A1* | 11/2010 | Sakai | F01D 25/243 | 415/214.1 |
| 2011/0014033 A1* | 1/2011 | Boning | F02B 37/24 | 415/148 |
| 2011/0189440 A1* | 8/2011 | Appleby | B29C 33/301 | 428/156 |
| 2012/0038145 A1* | 2/2012 | Ramos | F16L 23/003 | 285/80 |
| 2012/0070274 A1* | 3/2012 | Ferrazzi | F04D 29/601 | 415/203 |
| 2012/0207585 A1* | 8/2012 | Anderson | F04D 25/06 | 415/116 |
| 2012/0321455 A1* | 12/2012 | Boening | F04D 29/584 | 415/208.1 |
| 2013/0047605 A1* | 2/2013 | Drangel | F02C 6/12 | 60/605.1 |
| 2013/0136578 A1* | 5/2013 | Vetter | F01D 9/026 | 415/58.4 |
| 2013/0209193 A1* | 8/2013 | Doye | F16B 35/06 | 411/166 |
| 2014/0003973 A1* | 1/2014 | Arai | B60H 1/00521 | 417/363 |
| 2014/0047700 A1* | 2/2014 | Lohr | F16B 39/24 | 29/525.12 |
| 2014/0056721 A1* | 2/2014 | Garrard | H02K 9/197 | 417/44.1 |
| 2014/0125016 A1* | 5/2014 | Stafford | B23B 31/16275 | 279/123 |
| 2014/0186095 A1* | 7/2014 | Peters | F04D 29/023 | 403/30 |
| 2014/0261287 A1* | 9/2014 | Zurfluh | B29C 45/14336 | 123/195 R |
| 2014/0328676 A1* | 11/2014 | Robson | F04D 29/624 | 415/208.3 |
| 2015/0049967 A1* | 2/2015 | Fraser | F04D 29/0473 | 384/100 |
| 2015/0086347 A1* | 3/2015 | Jinnai | B23P 19/04 | 415/204 |
| 2015/0110600 A1* | 4/2015 | Mack | F04D 17/10 | 415/111 |
| 2015/0176446 A1* | 6/2015 | Leek | F01P 3/12 | 60/605.3 |
| 2015/0292345 A1* | 10/2015 | Giselmo | F01D 25/22 | 415/111 |
| 2015/0361992 A1* | 12/2015 | Tezuka | F04D 29/624 | 415/213.1 |
| 2015/0369642 A1* | 12/2015 | Cox | G01F 1/38 | 73/112.05 |
| 2016/0003139 A1* | 1/2016 | Maeda | F01D 25/26 | 60/605.3 |
| 2016/0084166 A1* | 3/2016 | Svihla | F02C 6/12 | 60/605.1 |
| 2016/0102608 A1* | 4/2016 | Lynn | F23R 3/28 | 60/787 |
| 2016/0130967 A1* | 5/2016 | Kelly | F02C 6/12 | 415/174.5 |
| 2016/0146154 A1* | 5/2016 | Scarr | F02K 1/80 | 415/213.1 |
| 2017/0248070 A1* | 8/2017 | Heddy, III | F02B 37/24 | |
| 2017/0260861 A1* | 9/2017 | Yoshida | F01D 11/08 | |
| 2017/0298819 A1* | 10/2017 | Kuno | F04D 25/04 | |
| 2017/0328788 A1* | 11/2017 | Coughlan | G01K 7/36 | |
| 2018/0156065 A1* | 6/2018 | Bunno | F16C 27/02 | |
| 2018/0163739 A1* | 6/2018 | Tabacchi | F02B 37/10 | |
| 2018/0238339 A1* | 8/2018 | Nickson | F04D 29/284 | |
| 2020/0340488 A1* | 10/2020 | Kobielski | F04D 29/668 | |

* cited by examiner

METHODS AND SYSTEMS FOR A COMPRESSOR HOUSING

FIELD

The present description relates generally to a turbo compressor housing comprising a sacrificial ring.

BACKGROUND/SUMMARY

As packaging space decreases due to increased performance demands and increased emissions standards, spaces previously utilized for turbochargers are reduced. The reduced packaging space may be insufficient during some vehicle operating conditions, such as a vehicle collision, where the turbocharger may contact another vehicle component and become damaged.

Other examples of addressing reduced turbocharger packaging constraints include decreasing a turbocharger size. However, the inventors have identified some issues with decreasing the turbocharger size, which may include decreased performance and fuel economy. Other examples may include separate engine components used to deflect the turbocharger in the event of a vehicle collision. However, the separate engine components further decrease packaging space and limit a size of other components arranged in the vehicle.

In one example, the issues described above may be addressed by a system for a turbocharger comprising a compressor housing physically coupled to a bearing housing via a clamp ring comprising a first portion separable from a second portion. In this way, the compressor housing may be selectively released from the bearing housing in response to a force.

As one example, one or more of the first and/or second portions may be tuned to break and/or fissure in response to the force, thereby allowing the compressor housing to detach from the bearing housing, wherein the compressor housing may shift and/or rotate. By doing this, the compressor housing may move less in a direction of the force relative to a turbine and the bearing housing. In this way, a packaging space may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5 are drawn to scale, although it is possible for other relative dimensions to be used.

DETAILED DESCRIPTION

Figure 1:
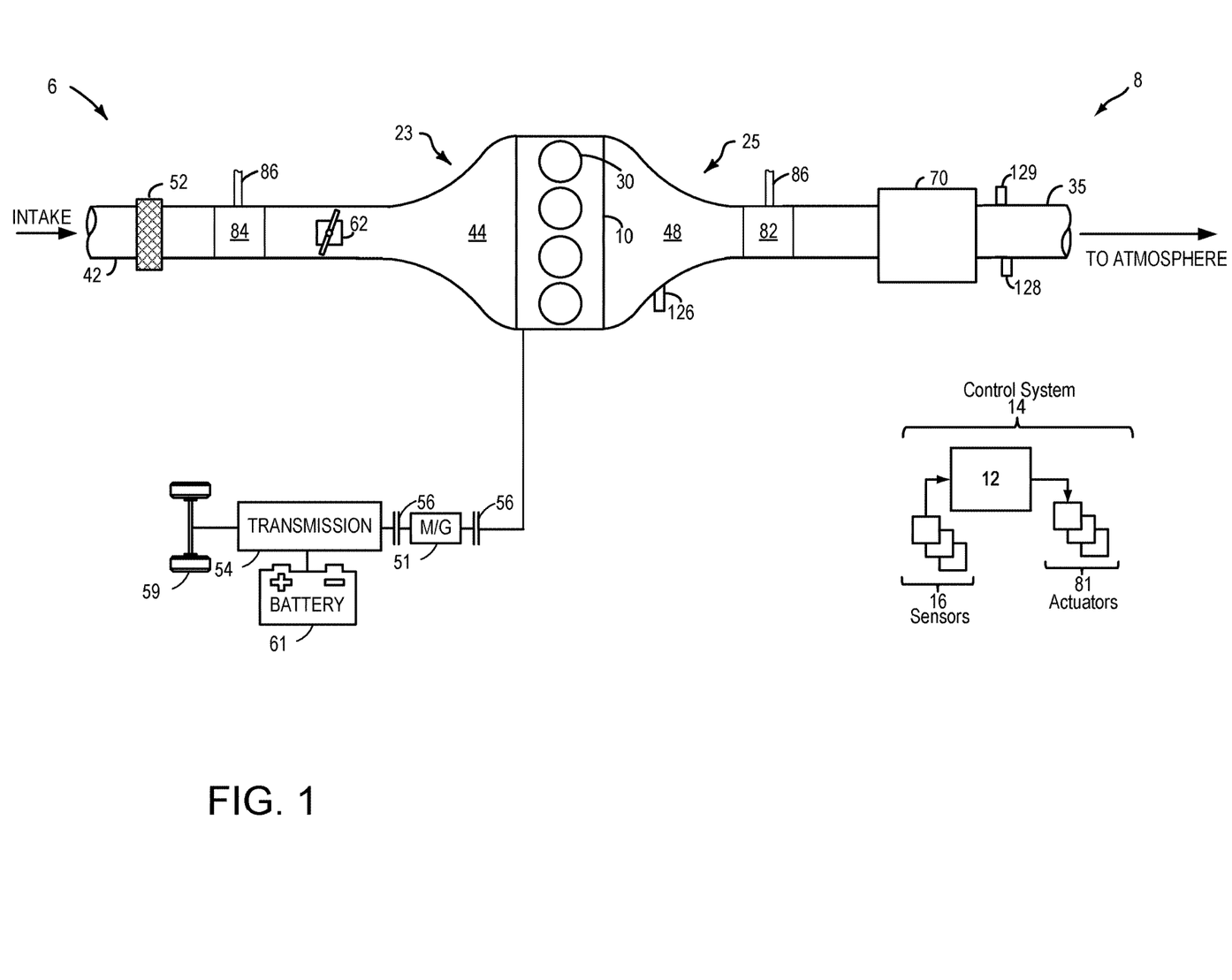
FIG. 1 a schematic of an engine included in a hybrid vehicle.
Figure 2:
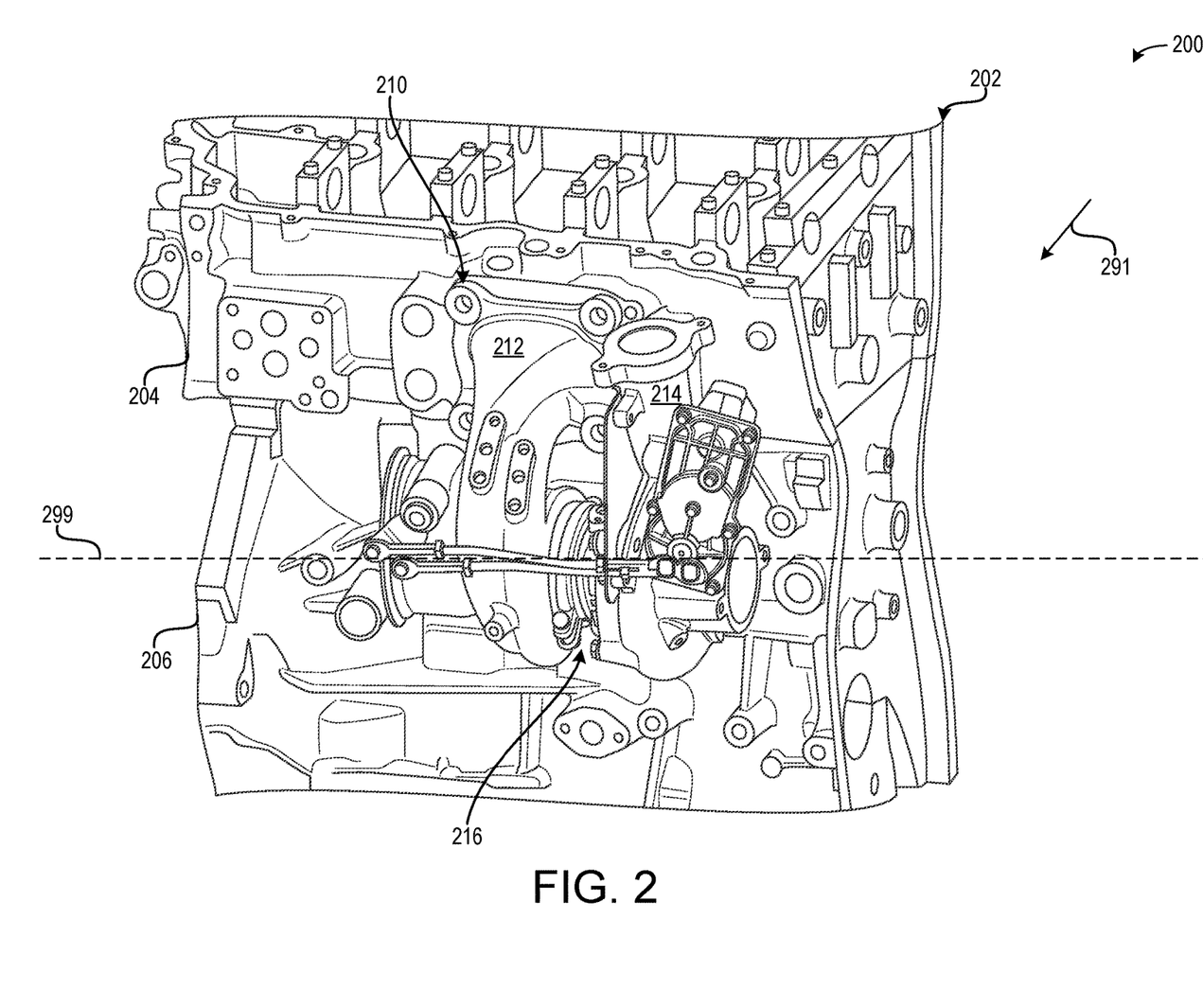
FIG. 2 illustrates a perspective view of a turbocharger coupled to the engine.
Figure 3:
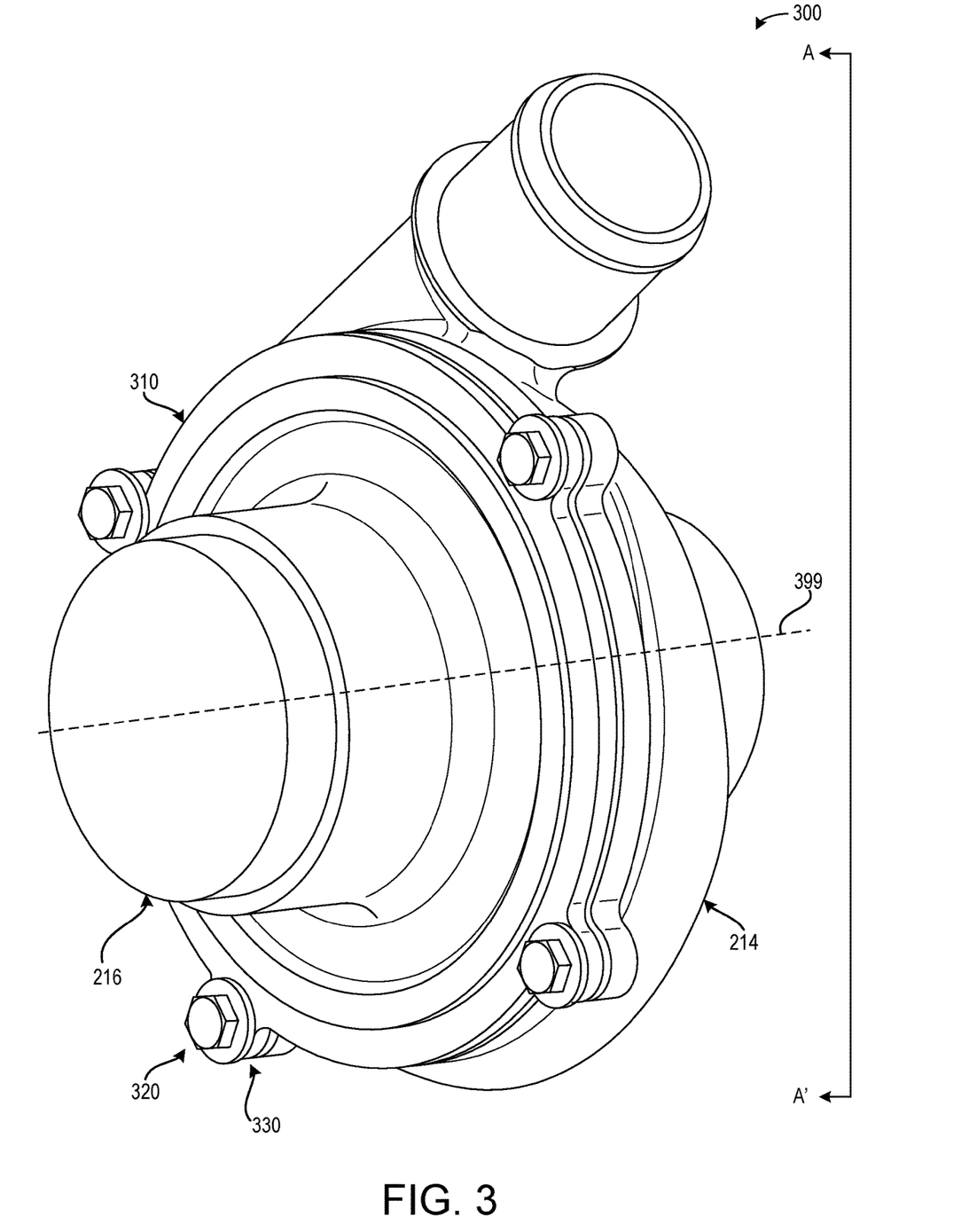
FIG. 3 illustrates an embodiment of a ring configured to clamp a compressor housing to a bearing housing.
Figure 4:
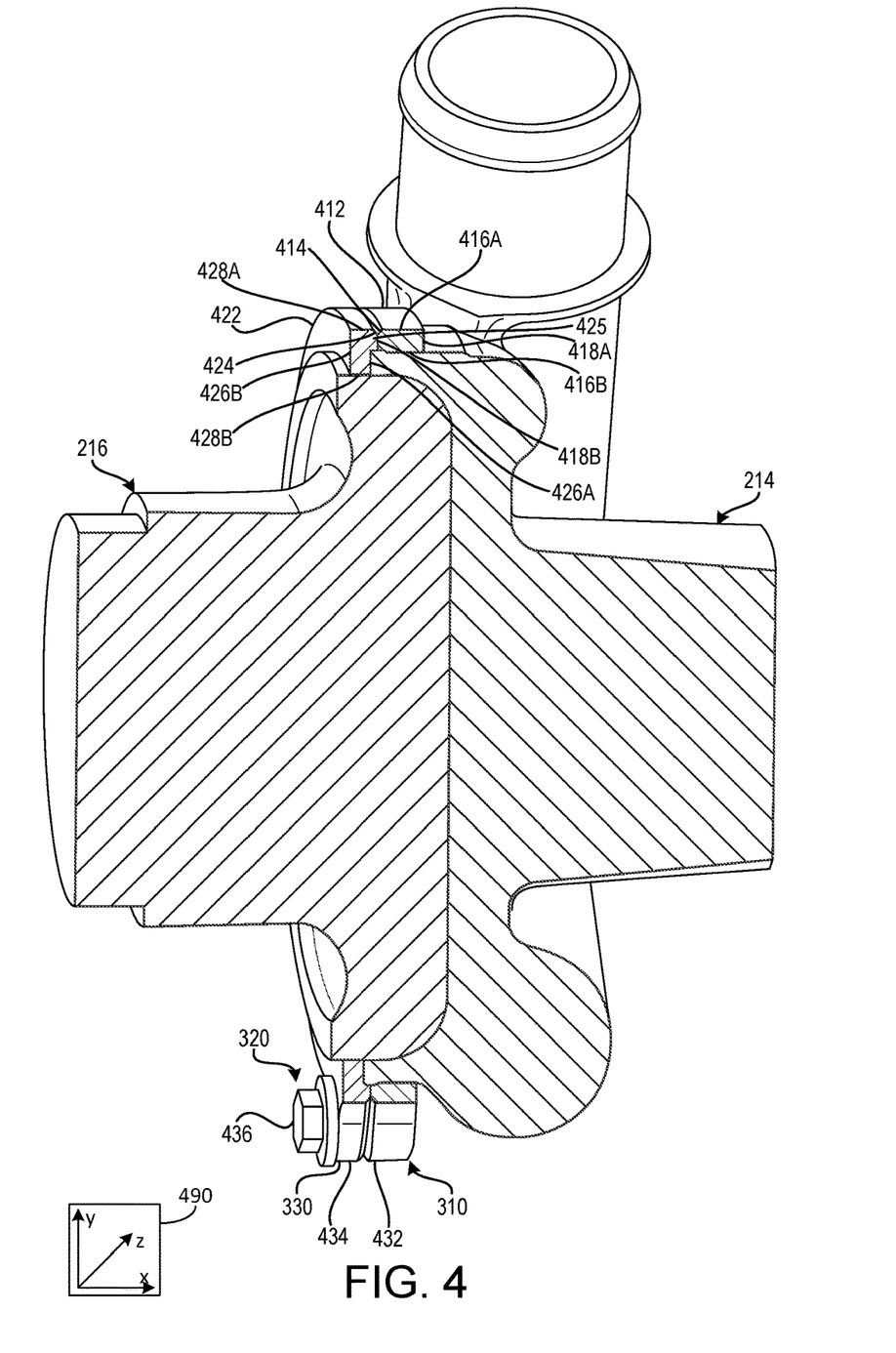
FIG. 4 illustrates a cross-section of the compressor housing, the bearing housing, and the ring.
Figure 5:
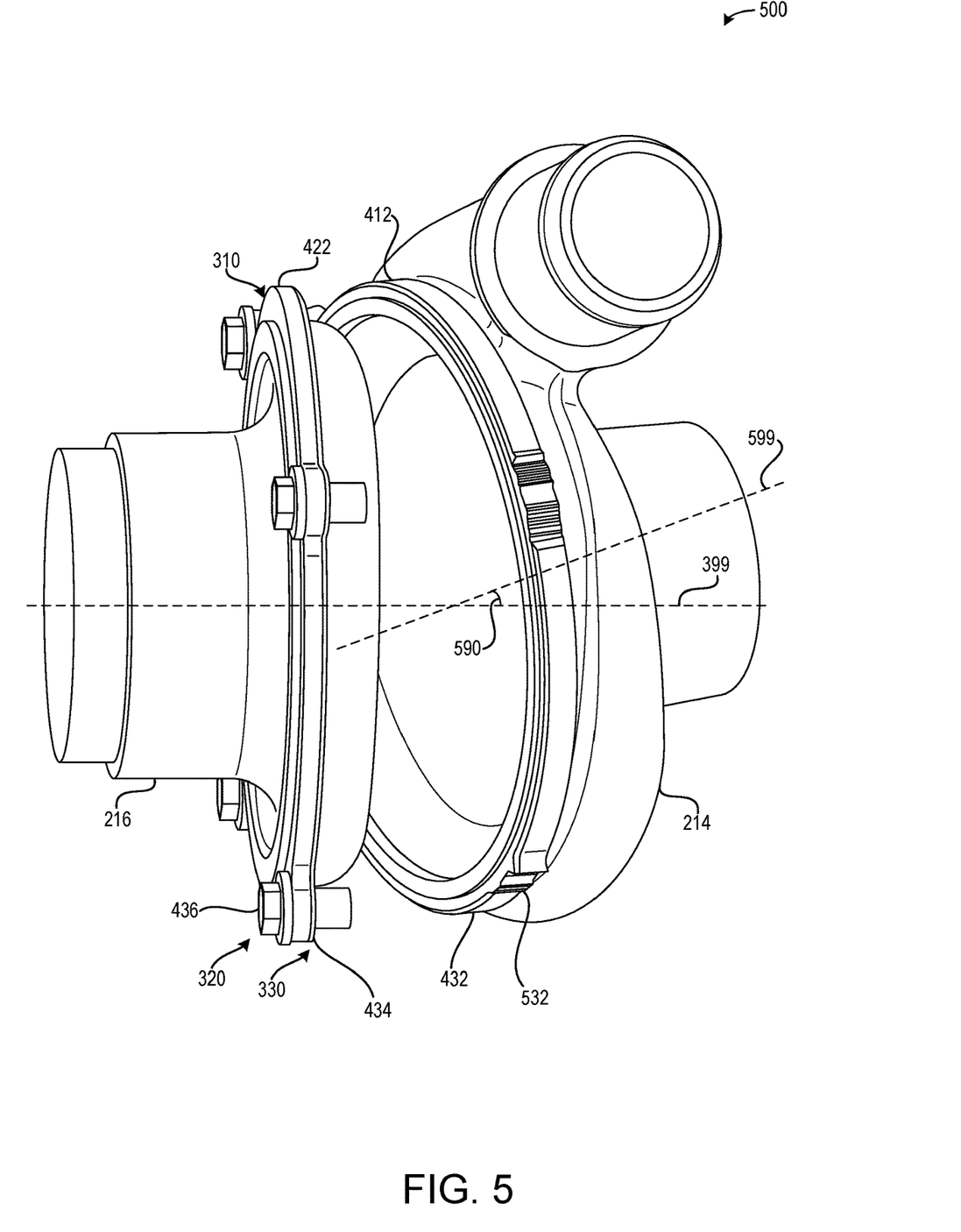
FIG. 5 illustrates an embodiment of the ring at least partially fissured to allow the compressor housing to rotate and/or shift.

The following description relates to systems and methods for physically coupling a compressor housing to a bearing housing. The compressor housing and the bearing housing may be arranged in a turbocharger of an engine. The engine is schematically illustrated in FIG. 1. An arrangement of the engine and the turbocharger is shown in FIG. 2. In one example, the engine is laterally-mounted in a front end of the vehicle. The turbocharger may be mounted between the engine and a second component. The compressor housing of the turbocharger may be physically coupled to the bearing housing via a ring, as shown in FIG. 3. A cross-section of the compressor housing, the bearing housing, and the ring is shown in FIG. 4. The ring may be configured to release the compressor housing from the bearing housing in response to an external force generated during a vehicle driving condition (e.g., a collision). FIG. 5 shows the compressor housing in a rotated position and/or a shifted position, relative to its starting position where it is physically coupled to the bearing housing.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger comprising a turbine 82 and a compressor 84. The turbine 82 and the compressor 84 may be rotatably coupled to one another via a shaft 86. The turbine 82 may rotate via an exhaust gas flow, wherein rotation of the turbine 82 may translate into rotation of the compressor 84 via the shaft 86. The compressor 84 is described in greater detail below.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows an embodiment 200 of a turbocharger 210 fluidly coupled to a head 204 of an engine 202. The engine 202 may be used similarly to the engine 10 of FIG. 1, in one example. The head 204 is physically coupled to a block 206 of the engine 202. Together, the head 204 and the block 206 may shape combustion chambers (e.g., cylinder 30), coolant passages, lubricant passages, and the like.

The turbocharger 210 comprises a turbine housing 212 (herein, turbine 212) and a compressor housing 214 (herein, compressor 214). A shaft (occluded in the example of FIG. 2) may transfer rotational motion from the turbine 212 to the compressor. The rotational motion may be a result of exhaust gas flowing through the turbine 212 and rotating a turbine blade therein. By doing this, the compressor may compress intake air, thereby increasing its density to increase a power output of the engine 202. The turbine housing 212 may be used to house the turbine 82 of FIG. 1. Likewise, compressor housing 214 may be used to house the compressor 84 of FIG. 1.

The shaft may be surrounded and supported by a bearing housing 216 (also known as a center housing) arranged between the turbine 212 and the compressor 214. The bearing housing 216 may comprise cast iron, aluminum, another material, and/or a mixture thereof. In one example, the bearing housing 216 comprises aluminum. The bearing housing 216 may comprise one or more internal passages for routing lubricant and/or coolant therethrough.

Each of the turbine 212 and the compressor 214 may be physically coupled to the bearing housing 216. As illustrated, the bearing housing 216 is sandwiched between the turbine 212 and the compressor 214. In previous examples, the bearing housing 216 may comprise one or more cutouts that align with cutouts of the turbine 212, wherein a fastener, such as a bolt or screw, may be inserted through a cutout of the cutouts to physically couple the bearing housing 216 to the turbine 212. Additionally or alternatively, cutouts may be arranged on an opposite side of the bearing housing 216 to physically couple the bearing housing 216 to the compressor 214.

In the example of FIG. 2, the engine 202 is mounted in a front of a vehicle (e.g., vehicle 6 of FIG. 1). The front end and/or anterior end of the vehicle may correspond to a leading edge of the vehicle as the vehicle is propelled while in a "drive" gear. Thus, a rear end and/or a posterior end of the vehicle may correspond to a trailing edge of the vehicle as the vehicle is propelled while in the "drive" gear. Thus, the rear end may be a leading edge and the front end may be a trailing edge when the vehicle is propelled while in a "reverse" gear.

The engine 202 may be mounted longitudinally or laterally. In one example, the engine 202 is mounted laterally. Additionally or alternatively, a longitudinal axis of the vehicle may be perpendicular to a longitudinal axis 299 of the engine 202.

As described above, the turbocharger 210 may be physically coupled to the engine 202, wherein the turbocharger 210 is mounted to an exhaust side of the engine 202. In the example of FIG. 2, the exhaust side may face an interior cabin of the vehicle. As such, an intake side, opposite of the exhaust side, may face a direction of propulsion of the vehicle when the vehicle is in the "drive" gear. Thus, the arrangement illustrated in FIG. 2 depicts the turbocharger 210 arranged between the engine 202 and the interior cabin of the vehicle.

During a collision, the engine 202 and the turbocharger 210 may be displaced, which may decrease a packaging space of the turbocharger 210. In some examples, a force of the collision may move the turbocharger 210 into another component arranged between the turbocharger 210 and the interior cabin. Thus, the inventors herein have recognized that it may be desired for a coupling element of the turbocharger 210 to allow a component of the turbocharger 210, such as the turbine 212, compressor 214, and/or bearing housing 216 to actuate in a direction different than a direction of force. For example, if the direction of force is perpendicular to the longitudinal axis 299, as shown by arrow 291, then the engine 202 and the turbocharger 210 may move in the direction of arrow 291. However, as will be described with respect to FIGS. 3 through 5, a coupling between the compressor 214 and the bearing housing 216 may be configured to allow the compressor 214 to rotate and/or actuate in a direction angled to the direction of force indicated by arrow 291.

Turning now to FIG. 3, it shows an embodiment 300 of the bearing housing 216 and the compressor 214. A portion of each of the bearing housing 216 and the compressor 214 may include aluminum. In one example, the portion of the compressor 214 and the bearing housing 216 comprising aluminum may correspond to a seal formed between the two.

A ring 310 may be arranged along an exterior of the compressor 214 and the bearing housing 216. The ring 310 may be radially outside of the seal formed between the compressor 214 and the bearing housing 216. In one example, a central axis 399 of the compressor 214 and the bearing housing 216 coincides with a geometric center of the ring 310.

The ring 310 may be molded around exterior surfaces of each of the compressor 214 and the bearing housing 216. The ring 310 may be a composite ring comprising a polymer material, wherein characteristics of the composite material may include where the polymer material is a high compression polymer. Additionally or alternatively, the polymer may be a low shear load polymer. The ring 310 may be in face sharing contact with a mounting structure of the compressor 214 without affecting a metal-to-metal seal between the compressor 214 and the bearing housing 216.

In one example, the ring 310 may comprise a polymer, such as a thermoplastic polymer. For example, the polymer may be acrylonitrile butadiene styrene (ABS). Additionally or alternatively, the ring 310 may comprise polyethylene (PE), polyphenylene oxide (PPO), polyvinylidene fluoride, and the like.

The ring 310 is illustrated comprising a plurality of bolts 320 inserted through a plurality of bolt-receiving openings 330. The bolts 320 may physically couple the compressor 314 to the bearing housing 316. As will be described below, the bolts 320 may be partially and/or fully threaded. In some examples, the bolts 320 may be threaded through only a portion of each through-hole of the plurality of bolt-receiving openings 330.

More specifically, in the example of FIG. 3, the plurality of bolts 320 comprise four bolts and the plurality of bolt-receiving openings 330 may comprise four bolt-receiving openings. Each bolt of the plurality of bolts 320 may be threaded through a single, corresponding bolt-receiving opening of the plurality of bolt-receiving openings 330.

The plurality of bolt-receiving openings 330 may be arranged around an outer circumference of the ring 310. Each of the plurality of bolt-receiving openings 330 extend in a radially outward direction, perpendicular to the central axis 399. In one example, the plurality of bolt-receiving openings 330 are arranged symmetrically (e.g., rotationally symmetrically) around an exterior of the ring 310. As such, an angle between adjacent bolt-receive openings may be equal to 90 degrees.

As will be described herein, the bolt-receiving openings 330 may comprise one or more features configured to allow one or more of the bolt-receiving openings 330 to degrade (e.g., break, crack, fissure, separate, or the like) in response to an external force, which may be parallel to the direction of arrow 291 of FIG. 2. By degrading the bolt-receiving openings 330, the compressor housing 214 may rotate and/or shift in a direction angled to a direction of the external force. By doing this, the compressor housing 214 may be less likely to contact another component or enter the vehicle cabin interior despite the limited packaging space of the turbocharger (e.g., turbocharger 210 of FIG. 2).

Turning now to FIG. 4, it shows a cross-section 400 of the compressor 214, the bearing housing 216, and the ring 310. The cross-section 400 is taken along cross-section plane A-A' parallel to the central axis 399 of the compressor 214 and the bearing housing 216. An axis system 490 is shown comprising three axes, namely an x-axis parallel to a horizontal direction, a y-axis parallel to a vertical direction, and a z-axis perpendicular to each of the x- and y-axes. The central axis 399 is parallel to the x-axis in the example of FIG. 4, however, other orientations of the compressor 214 and the bearing housing 216 may be realized without departing from the scope of the present disclosure.

The ring 310 may comprise a first portion 412 and a second portion 422. The first portion 412 may be arranged on a compressor side of the ring 310. As shown, the cross-section of the first portion 412 may comprise a substantially rectangular shape. The first portion 412 may further comprise a chamfer 414 at a location furthest away from the compressor 214. In one example, the first portion 412 comprises the chamfer 414 at a location adjacent to the second portion 422 of the ring 310 and furthest away from the compressor 214 and the bearing housing 216.

Said another way, the first portion 412 comprises a first longitudinal side 416A opposite a second longitudinal side 416B. The first portion 412 further comprises a first lateral side 418A opposite a second lateral side 418B. The chamfer 414 may be arranged at an intersection between the first longitudinal side 416A and the second lateral side 418B. Thus, the second longitudinal side 416B may be in face sharing contact with an outer surface of the compressor 214.

The second portion may be arranged on a bearing side of the ring 310. As shown, the cross-section of the second portion 422 may comprise a substantially rectangular shape. The second portion may further comprise a chamfer 424 at a location furthest away from the compressor 214 and the bearing housing 216. In one example, the cross-section of the second portion 422 may deviate from the rectangular shape at the chamfer 424, wherein the chamfer 424 may be arranged on an extension 425 of the second portion 422. The extension 425 may extend from a first longitudinal side 426A and a first lateral side 428A. A second longitudinal side 426B may be opposite the first longitudinal side 426A. A first lateral side 428A may be opposite to a second lateral side 428B, wherein the lateral sides may be contiguous with the longitudinal sides. The first longitudinal side 426A is arranged on a compressor side of the second portion 422, wherein the first longitudinal side 426A without the extension 425 is in face-sharing contact with an outer surface of the compressor. The extension 425 extends in a direction parallel to the central axis 399 toward the first portion 412, wherein the extension 425 is in face sharing contact with the second lateral side 418B. In this way, the chamfers 414 and 424 may be arranged directly adjacent to one another, forming a depression along a central portion of the ring 310.

In this way, the ring 310 comprises two portions oriented opposite one another. That is to say, the first portion 412 is oriented in a first orientation, where longitudinal sides of the first portion are substantially parallel to the central axis 399. The second portion 422 is oriented in a second orientation, different than the first orientation, where longitudinal sides of the second portion are substantially perpendicular to the central axis 399. In this way, the ring 310, comprising each of the first portion 412 and the second portion 422 may comprise an L-shaped cross-section. The first portion 412 and the second portion 422 may be contiguous with one another with no gaps or intervening components arranged therebetween.

As described above, the ring 310 may be used to physically couple the compressor housing 214 to the bearing housing 216. However, the ring 310 physically couples the compressor housing 214 and the bearing housing 216 together without extending a fastener, such as a bolt or screw, through surfaces of the compressor housing 214 and the bearing housing 216. Said another way, a fastener used to physically couple the compressor housing 214 and the bearing housing 216 may be spaced away from and may not touch each of the compressor housing 214 and the bearing housing 216. In this way, the plurality of bolts 320 do not extend into an interior volume of the compressor housing 214 and the bearing housing 216. However, the coupling between the turbine (e.g., turbine 212 of FIG. 2) and the bearing housing 216 may include where fasteners, such as bolts, extend through interior volumes of the bearing housing 216 and the turbine to physically couple the turbine and the bearing housing 216.

More specifically, the ring 310 may be molded onto outer surfaces of the compressor 214 and the bearing housing 216. The ring 310 may further comprise a through-hole 430, which may be one of a plurality of bolt-receiving openings 330 illustrated in FIG. 3. The through-hole 430 may comprise a first receiving end 432 and a second receiving hole end. The first receiving end 432 may be physically coupled to the first portion 412 and the second receiving end 434 may be physically coupled to the second portion 422. The first receiving end 432 and the second receiving end 434 may extend radially outwardly from the first portion 412 and the second portion 422, respectively. The first receiving end 432 and the second receiving end 434 may be aligned along the x-axis such than through-holes arranged therein are aligned and positioned to receive fastener 436.

As illustrated, the fastener 436, which is a bolt in one example, is first received by a second receiving through-hole of the second receiving end 434. The fastener 436 may be threaded through the second receiving through-hole before reaching a first receiving through-hole of the first receiving end 432. The first receiving through-hole may comprise a variety of surface features, such as ribs or the like, that may adjust a strength of the first receiving end 432. By doing this, the first receiving end 432 may shear at various forces via a tuning of the surface features and material selection of the first receiving end 432. The surface features, shearing, and movement of the compressor 214 are described in greater detail with respect to FIG. 5.

Turning now to FIG. 5, it shows an embodiment 500 illustrating a position of the compressor 214 following a vehicle collision. The vehicle collision may be from a front-end, a rear-end, or a side of the vehicle. In one example, the resulting movement of the compressor 214 is due to a front end vehicle collision, wherein a force of the collision overcomes a threshold shear force of the ring 310.

As illustrated in FIG. 5, the compressor 214 is at least partially detached from the bearing housing 216. More specifically, the compressor 214 is rotated relative to its attached position shown in FIG. 4. A central axis 599 of the compressor 214 is misaligned with the central axis 399 of the turbocharger 210. An angle 590 between the central axis 399 and the central axis 599 may be between 0 and 90 degrees, more specifically between 10 to 70 degrees. In some examples, additionally or alternatively, the angle 590 may be between 20 to 60 degrees. In some examples, additionally or alternatively, the angle 590 may be between 20 to 50 degrees. In some examples, additionally or alternatively, the angle 590 may be between 20 to 40 degrees. In some examples, additionally or alternatively, the angle 590 may be between 20 to 30 degrees.

The compressor 214 may rotate and/or shift during the collision due to the force of the collision overcoming the threshold shear force. In one example, the threshold shear force may be tuned based on a desired performance (e.g., coupling between the compressor 214 and the bearing housing 216) and packaging space. The threshold shear force may be based on a force of a collision that is greater than other forces that may occur during vehicle conditions outside of the collision. In one example, the threshold shear force is approximately 10 kN. The packaging space may be based on a movement of the turbocharger 210 during the collision. Thus, to maintain the packaging space, the tuning of the threshold shear force of the ring 310 may be such that in the event of a collision where a collision force is sufficient to adjust a position of the turbocharger such that the turbocharger may collide with another vehicle component, the ring 310 may degrade (e.g., crack and/or release) to allow the compressor 214 to at least partially detach from the bearing housing 216. By doing this, the compressor 214 movement in a direction of the collision force may be decreased relative to a coupling between the bearing housing 216 and the compressor 214 without the ring 310. Additionally or alternatively, the tuning of the threshold shear force may be tuned so that inadvertent movement of the compressor 214 does not occur due to road conditions (e.g., vibrations, etc.) and due to a collision that may not result in sufficient movement of the turbocharger to contact another vehicle component or enter the vehicle interior cabin. In one example, the ring 310 is configured to withstand forces of at least 1 kN so that degradation due to vibration, heat, aging, and the like outside of a collision do not allow the ring 310 to shear.

The threshold shear force may be tuned via one or more of a material composition of the ring 310, a material thickness of the plurality of bolt receiving openings 330, and surface features arranged on the first or second receiving ends 432, 434. The tuning may occur on one or more of bolt receiving openings of the plurality of bolt receiving openings 330. More specifically, the tuning may occur on one or more of the first receiving end 432 and the second receiving end 434.

In the example of FIG. 5, the first receiving ends 432 comprise a ribbing 532. The ribbing 532 may comprise a plurality of ribs arranged around an opening through which the fastener 436 extends. The fastener 436 may be threaded through only the second receiving ends 434. As such, threading, if present, near an extreme end of the fastener 436 that is inserted into the first receiving end 432 may not be threaded with the ribbing 532 or other surface features of the first receiving end 432.

A number and/or magnitude of the ribbing 532 may be adjusted to adjust the threshold shear force of the ring 310. For example, if the number and/or the magnitude of the ribbing 532 is increased, then the threshold shear force of the ring 310 may be reduced, thereby allowing the compressor 214 to rotate and/or shift in response to a lower force. The magnitude of the ribbing 532 may correspond to a size of each rib of the ribbing, wherein the size increases as the magnitude increases. The surface feature may be a feature different than or in addition to the ribbing 532, wherein the feature may be a perforation, an etching, and the like.

The surface features, including the ribbing 532 may be arranged on one or more of the bolt receiving openings 330. In some examples, the surface features are arranged on each of the bolt receiving openings 330. In other examples, the surface features are arranged on only some of the bolt receiving openings 330, wherein the bolt receiving openings 330 comprising the surface features are selected based on a desired shift and/or a desired rotation of the compressor 214. In one example, the bolt receiving openings 330 facing away from the engine, toward the vehicle interior, may be the only openings with the surface features. Additionally or alternatively, each of the bolt receiving openings 330 may comprise a different surface feature number, shape, or magnitude, such that each individual bolt receiving opening of the plurality of bolt receiving openings 330 may be individually tuned to allow the compressor 214 to shift to a desired position following a vehicle collision.

One or more of the first and second receiving ends 432, 434 may shear in response to a force in a radially outward direction, wherein the shearing may be a combination of shear and tensile forces generated due to an external force. The external force may be generated during a vehicle collision, wherein the vehicle collision may occur at a front-end of the vehicle in a direction parallel to a longitudinal axis of the vehicle. In one example, only of the first portion 412 or the second portion 422 is comprises of a composite material that may allow the ring 310 to shear (e.g., degrade) to allow the compressor to shift in a direction angled to a direction of the vehicle collision.

In this way, the compressor housing may be coupled to the bearing housing via a ring. The ring may be a clamp ring in one example. The ring may further comprise one or more surface features arranged on receiving-holes of the ring, wherein the surface features may decrease a strength and/or durability of a portion of the ring, such that the ring may degrade (e.g., cleave and/or divide) in response to an external force. The technical effect of the surface features of the ring may be to allow the compressor to shift in response to the external force, such that the compressor may move less in a direction of the external force to decrease contact between the compressor and another component.

An embodiment of a system comprises a turbocharger comprising a compressor housing physically coupled to a bearing housing via a clamp ring comprising a first portion separable from a second portion.

A first example of the system further comprises where the first portion is contiguous and in face sharing contact with the second portion.

A second example of the system, optionally including the first example, further includes where the first portion comprises a first chamfer and the second portion comprises a second chamfer, and where the first and second chamfers are adjacent one another.

A third example of the system, optionally including one or more of the previous examples, further includes where the first chamfer is perpendicular to the second chamfer.

A fourth example of the system, optionally including one or more of the previous examples, further includes where the first portion and the second portion comprise a rectangular cross-section, wherein the clamp ring comprises an L-shaped cross-section.

A fifth example of the system, optionally including one or more of the previous examples, further includes where the clamp ring is molded to exterior surfaces of the compressor housing and the bearing housing.

A sixth example of the system, optionally including one or more of the previous examples, further includes where the first portion and the second portion comprise openings configured to receive fasteners, wherein openings of the first portion comprise surface features.

A seventh example of the system, optionally including one or more of the previous examples, further includes where the surface features comprise ribbings.

An eighth example of the system, optionally including one or more of the previous examples, further includes where a fastener of the fasteners is threaded through the openings of the second portion and not the openings of the first portion.

An embodiment of a coupling device, comprises a clamp ring comprising a first portion and a second portion, wherein the first portion comprises a first plurality of bolt receiving openings and the second portion comprises a second plurality of bolt receiving openings, wherein the first plurality of bolt receiving openings comprise a ribbing configured to decrease a tensile strength of the first plurality relative to the second plurality.

A first example of the coupling device further comprises where the first portion and the second portion comprise a polymer with high compression and low shear load characteristics.

A second example of the coupling device, optionally including the first example, further includes where bolt receiving openings of the first plurality are identical to one another.

A third example of the coupling device, optionally including one or more of the previous examples, further includes where bolt receiving openings of the first plurality are different, wherein a first bolt receiving opening comprises a greater amount of the ribbing than a second bolt receiving opening.

A fourth example of the coupling device, optionally including one or more of the previous examples, further includes where clamp ring is molded around a compressor housing to physically couple the compressor housing to a bearing housing, wherein a compressor housing cover is aluminum and an internal metal-to-metal seal between the compressor housing and the bearing housing is untouched by the clamp ring.

A fifth example of the coupling device, optionally including one or more of the previous examples, further includes where each of the first portion and the second portion comprise a rectangular cross-section, wherein the first and second portions are oriented perpendicularly relative to respective longitudinal axes.

An embodiment of a vehicle comprises a bearing housing physically coupled to each of a turbine and a compressor of a turbocharger, wherein a ring, molded to external surfaces of the compressor and the bearing housing, clamps the compressor to the bearing housing.

A first example of the ring further comprises where a first piece comprising a first plurality of fastener receiving openings and a second piece comprising a second plurality of fastener receiving openings, wherein a fastener is threaded through a fastener receiving opening of the second plurality of fastener receiving openings and inserted into a fastener receiving opening of the first plurality of fastener receiving openings to physically couple the compressor to the bearing housing.

A second example of the ring, optionally including the first example, further includes where one or more of the first and second pluralities of fastener receiving openings comprise surface features and a low shear load polymer material configured to decrease a threshold shear force of the ring.

A third example of the ring, optionally includes one or more of the previous examples, further includes where the fastener is arranged completely outside of an interior volume of the compressor and the bearing housing.

A third example of the ring, optionally includes one or more of the previous examples, further includes where the turbocharger is arranged between an engine and another vehicle component, and where the ring is configured to release the compressor in response to the engine contacting the turbocharger with a force greater than the threshold shear force.

In another representation, the vehicle is a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
fasteners; and
a turbocharger comprising a compressor housing physically coupled to a bearing housing via a clamp ring comprising a first portion separable from a second portion, and wherein the first portion and the second portion comprise openings configured to receive the fasteners and wherein each fastener of the fasteners is threaded through all openings of the second portion and a portion of the openings of the first portion, wherein a remaining portion of the openings of the first portion comprise ribbings and do not thread with the fasteners.

2. The system of claim 1, wherein the first portion is contiguous and in face sharing contact with the second portion.

3. The system of claim 1, wherein the first portion comprises a first chamfer and the second portion comprises a second chamfer, and where the first and second chamfers are adjacent one another.

4. The system of claim 1, wherein the first chamfer is perpendicular to the second chamfer.

5. The system of claim 1, wherein the first portion and the second portion individually comprise a rectangular cross-section, wherein the first portion and the second portion together comprise an L-shaped cross-section.

6. The system of claim 1, wherein the clamp ring is molded to exterior surfaces of the compressor housing and the bearing housing.

7. The system of claim 1, wherein each fastener of the fasteners is not threaded with the openings of the first portion facing away from an engine.

8. A coupling device for a bearing housing and a compressor housing, comprising:
bolts;
a clamp ring comprising a polymer including a first portion and a second portion, wherein the first portion comprises a first plurality of bolt receiving openings and the second portion comprises a second plurality of bolt receiving openings, wherein the first plurality of bolt receiving openings comprise a ribbing configured to decrease a tensile strength of the first plurality relative to the second plurality, wherein the ribbing does not thread with the bolts and is arranged on only a portion of the first plurality of bolt receiving openings facing away from an engine.

9. The coupling device of claim 8, wherein the polymer comprises a higher compression and a lower shear load relative to metal.

10. The coupling device of claim 8, wherein bolt receiving openings of the first plurality are identical to one another.

11. The coupling device of claim 8, wherein the portion of the bolt receiving openings of the first plurality are different than a remaining portion of the bolt receiving openings of the first plurality of openings, wherein the portion comprises a greater amount of the ribbing than the other portion.

12. The coupling device of claim 8, wherein the compressor housing cover is aluminum and an internal metal-to-metal seal between the compressor housing and the bearing housing is untouched by the clamp ring.

13. The coupling device of claim 8, wherein each of the first portion and the second portion comprise a rectangular cross-section, wherein the first and second portions are oriented perpendicularly to one another relative to respective longitudinal axes, and wherein the second portion comprises an extension that extends toward and around the compressor housing.

14. A vehicle, comprising:
a bearing housing physically coupled to each of a turbine and a compressor of a turbocharger, wherein a ring comprising a polymer, molded to external surfaces of the compressor and the bearing housing, clamps the compressor to the bearing housing, and wherein the ring comprises a first piece comprising a first plurality of fastener receiving openings and a second piece comprising a second plurality of fastener receiving openings, a portion of the first plurality of fastener receiving openings facing away from an engine comprises a ribbing configured to decrease a shear load and not thread with a fastener.

15. The vehicle of claim 14, wherein a fastener is threaded through fastener receiving openings of the second plurality of fastener receiving openings and inserted into fastener receiving openings of the first plurality of fastener receiving openings to physically couple the compressor to the bearing housing.

16. The vehicle of claim 14, wherein one or more of the first and second pluralities of fastener receiving openings comprise surface features and a low shear load polymer material configured to decrease a threshold shear force of the ring, wherein the threshold shear force is greater than or equal to 1 kN.

17. The vehicle of claim 14, wherein the fastener is arranged completely outside of an interior volume of the compressor and the bearing housing.

18. The vehicle of claim 14, wherein the turbocharger is arranged between an engine and another vehicle component, and where the ring is configured to release the compressor in response to the engine contacting the turbocharger with a force greater than the threshold shear force.

* * * * *